United States Patent
Seeley

(10) Patent No.: US 10,018,354 B2
(45) Date of Patent: Jul. 10, 2018

(54) INLET ASSEMBLY

(71) Applicant: Edwards Limited, West Sussex (GB)

(72) Inventor: Andrew James Seeley, Bristol (GB)

(73) Assignee: Edwards Limited, Burgess Hill, West Sussex (GB)

( * ) Notice: Subject to any disclaimer, the term of this patent is extended or adjusted under 35 U.S.C. 154(b) by 60 days.

(21) Appl. No.: 14/416,457

(22) PCT Filed: Jun. 20, 2013

(86) PCT No.: PCT/GB2013/051625
§ 371 (c)(1),
(2) Date: Jan. 22, 2015

(87) PCT Pub. No.: WO2014/016553
PCT Pub. Date: Jan. 30, 2014

(65) Prior Publication Data
US 2015/0176838 A1    Jun. 25, 2015

(30) Foreign Application Priority Data

Jul. 27, 2012   (GB) .................................. 1213373.2

(51) Int. Cl.
*F23D 14/50*   (2006.01)
*F23D 11/38*   (2006.01)
(Continued)

(52) U.S. Cl.
CPC ............ *F23D 14/50* (2013.01); *F23D 11/386* (2013.01); *F23G 7/06* (2013.01); *B01D 53/68* (2013.01);
(Continued)

(58) Field of Classification Search
CPC ................................ F23D 11/386; F23D 14/50
(Continued)

(56) References Cited

U.S. PATENT DOCUMENTS 5,183,646 A * 2/1993 Anderson .............. B01D 53/34
422/173
5,891,404 A    4/1999 Ibaraki et al.
(Continued)

FOREIGN PATENT DOCUMENTS

CN    202018043 U    10/2011
EP     0694735 A1    1/1996
(Continued)

OTHER PUBLICATIONS

British Search Report dated Oct. 8, 2012 for corresponding British Application No. GB1213373.2.
(Continued)

*Primary Examiner* — Avinash Savani
*Assistant Examiner* — Aaron Heyamoto
(74) *Attorney, Agent, or Firm* — Westman, Champlin & Koehler, P.A.; Theodore M Magee

(57) ABSTRACT

An inlet assembly for a burner includes a manifold having an inlet aperture and a coaxially aligned outlet aperture, the manifold having a nozzle bore extending along a longitudinal axis between the inlet aperture and the outlet aperture for conveying an effluent gas from an inlet pipe coupleable with the inlet aperture to the outlet aperture for delivery to a combustion chamber of the burner. A nozzle bore scraper is housed within the nozzle bore. An actuator is operable to reciprocate the nozzle bore scraper relative to the nozzle bore, the nozzle bore scraper reciprocating along the longitudinal axis within the nozzle bore between a rest position and an actuated position to reduce effluent gas deposits within the nozzle bore.

14 Claims, 6 Drawing Sheets

(51) Int. Cl.
*F23G 7/06* (2006.01)
*B01D 53/68* (2006.01)

(52) U.S. Cl.
CPC .................. *B01D 2257/204* (2013.01); *B01D 2258/0216* (2013.01); *F23G 2209/142* (2013.01)

(58) Field of Classification Search
USPC ..................................................... 431/3, 123
See application file for complete search history.

(56) References Cited

U.S. PATENT DOCUMENTS

| | | | |
|---|---|---|---|
| 6,261,524 B1 | 7/2001 | Herman et al. | |
| 6,267,583 B1 * | 7/2001 | Mandai | F23D 23/00 431/278 |
| 7,138,096 B2 | 11/2006 | Moore et al. | |
| 2003/0047070 A1 | 3/2003 | Flippo et al. | |
| 2007/0217983 A1 | 9/2007 | Stanton et al. | |
| 2008/0038171 A1 | 2/2008 | Johnsgard et al. | |
| 2012/0128541 A1 | 5/2012 | Kashiwagi et al. | |

FOREIGN PATENT DOCUMENTS

| | | |
|---|---|---|
| JP | S55-016299 | 2/1980 |
| JP | H04-504613 | 8/1992 |
| JP | 2007-511362 | 5/2007 |

OTHER PUBLICATIONS

PCT Notification of Transmittal of the International Search Report and the Written Opinion of the International Search Authority, or the Declaration, International Search Report and Written Opinion dated Sep. 30, 2013 for corresponding PCT Application No. PCT/GB2013/051625.

Translation of the Office Action of the Intellectual Property Office of Japan for corresponding Patent Application No. 2015-523605 dated Nov. 8, 2016, 2 pgs.

Translation of the Office Action of the Intellectual Property Office of Taiwan dated Oct. 4, 2016, 4 pgs.

Translation of the Search Report of ROC (Taiwan) Patent Application No. 102124955 dated Sep. 25, 2016, 1 pg.

* cited by examiner

INLET ASSEMBLY

CROSS-REFERENCE TO RELATED APPLICATION

This Application is a Section 371 National Stage Application of International Application No. PCT/GB2013/051625, filed Jun. 20, 2013, which is incorporated by reference in its entirety and published as WO 2014/016553 A1 on Jan. 30, 2014 and which claims priority of British Application No. 1213373.2, filed Jul. 27, 2012.

FIELD OF THE INVENTION

The present invention relates to an inlet assembly for a burner and a method.

BACKGROUND

Burners are known and are typically used for treating an effluent gas stream from a manufacturing process tool used in, for example, the semiconductor or flat panel display manufacturing industry. During such manufacturing, residual perfluorinated compounds [PFCs] and other compounds exist in the effluent gas stream pumped from the process tools. PFCs and the other compounds are typically difficult to remove from the effluent gas stream and their release into the environment is undesirable because they are known to have relatively high greenhouse activity.

Known burners use combustion to remove the PFCs and other compounds from the effluent gas stream. Typically, the effluent gas stream is a nitrogen stream containing PFCs and other compounds. In a radiant burner, a fuel gas is mixed with the effluent gas stream and that gas stream mixture is conveyed into a combustion chamber that is laterally surrounded by the exit surface of a foraminous gas burner. A fuel gas and air are simultaneously supplied to the foraminous gas burner to affect flameless combustion at the exit surface, with the amount of air passing through the foraminous burner being sufficient to consume not only the fuel gas supply to the burner but also the combustibles in the gas stream mixture injected into the combustion chamber.

As the surface areas of the semiconductors being processed increases, the flow rate and range of compounds in the effluent gas also increases.

Although techniques exist for processing the effluent gas stream, they each have their own shortcomings. Accordingly, it is desired to provide an improved technique for processing and effluent gas stream.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided an inlet assembly for a burner, the inlet assembly comprising: a manifold having an inlet aperture and a coaxially aligned outlet aperture, the manifold having a nozzle bore extending along a longitudinal axis between the inlet aperture and the outlet aperture for conveying an effluent gas from an inlet pipe coupleable with the inlet aperture to the outlet aperture for delivery to a combustion chamber of the burner; a nozzle bore scraper housed within the nozzle bore; and an actuator operable to reciprocate the nozzle bore scraper relative to the nozzle bore, the nozzle bore scraper reciprocating along the longitudinal axis within the nozzle bore between a rest position and an actuated position to reduce effluent gas deposits within the nozzle bore.

The first aspect recognizes that a problem with increasing the flow rate and range of compounds in the effluent gas is that existing inlet assemblies for burners can become clogged with deposits or residues which are typically provided by condensables (such as Ammonium hexafluorosilicate, $(NH_4)_2SiF_6$, and Aluminium Chloride, $Al_2Cl_6$) within the effluent gas. Such deposits will impair the operation of the burner by restricting or impairing the flow of the effluent gas into the combustion chamber or by influencing the chemistry of the combustion occurring within the burner. This problem is exacerbated by any sudden changes in flow direction resulting from changes in direction of the nozzle bore within the inlet assembly which tends to cause an increase in such deposits.

Accordingly, an inlet assembly for a gas abatement apparatus or burner is provided. The assembly may comprise a manifold. The manifold may have an inlet aperture and an outlet aperture. The inlet aperture and outlet aperture may be coaxially aligned. The inlet aperture and the outlet aperture may be defined by a nozzle bore which extends along a longitudinal axis between the inlet and outlet apertures. For example, a line extending from a centre point of the inlet aperture to the centre point of the outlet aperture may define the longitudinal axis of the nozzle bore. The nozzle bore may convey an effluent gas stream from an inlet pipe which may couple with the inlet aperture to the outlet aperture. The effluent gas may be provided by the outlet aperture into a combustion chamber of the burner. A nozzle bore scraper may be provided, housed or retained within the nozzle bore. An actuator may be provided which reciprocates or translates the nozzle bore scraper relative to the nozzle bore. The movement of the nozzle bore scraper may occur along the longitudinal axis. The provision of the nozzle bore, which may be plane bore which avoids directional changes, reduces the likelihood of deposits occurring. Also, movement of the nozzle bore scraper relative to the nozzle bore between rest and actuated positions causes the nozzle bore scraper to scrape effluent deposits within the nozzle bore. This helps to prevent clogging with deposits or residues which would otherwise impair the operation of the burner by restricting or impairing the flow of the effluent gas into the combustion chamber or by influence the chemistry of the combustion occurring within the burner.

In one embodiment, the nozzle bore is one of linear, straight and cylindrical.

In one embodiment, the nozzle bore is one of a parallel-sided cylinder and a normal cylinder. It will be appreciated that this provides a regular cross-section extending the length of the bore which may be traversed using a direct linear motion. This both eliminates directional changes within the bore itself to reduce the likelihood of deposits occurring whilst also providing for controllable and reliable translation of the nozzle bore scraper within the nozzle bore.

In one embodiment, the inlet aperture and the outlet aperture are concentric.

In one embodiment, the nozzle bore is shaped to provide a generally unidirectional flow of the effluent gas from the inlet aperture to the outlet aperture. Providing unidirectional flow of the effluent gas reduces the likelihood of deposits occurring within the nozzle bore.

In one embodiment, the nozzle bore scraper is dimensioned to extend at least partially along the longitudinal axis.

Accordingly, the nozzle bore scraper extends along the nozzle bore access to help to provide for reliable movement within the nozzle bore.

In one embodiment, the nozzle bore scraper is dimensioned have a longitudinal length which exceeds a longitudinal distance of throw between the rest position and the actuated position.

In one embodiment, the nozzle bore scraper protrudes from the outlet aperture in the actuated position. By causing the nozzle bore scraper to protrude or extend out of the outlet aperture, any residue scraped by the nozzle bore scraper is completely removed from the nozzle bore. This improves the likelihood of the residues being removed from the nozzle bore.

In one embodiment, the nozzle bore scraper is retained within the nozzle bore in the rest position. Retaining the nozzle bore scraper within the nozzle bore helps to protect the nozzle bore scraper during the normal operation of the burner and reduces the likelihood of sintering of any deposits that may still be retained on the nozzle bore scraper itself.

In one embodiment, the nozzle bore scraper is retained within the nozzle bore at a distance from the outlet aperture in the rest position.

In one embodiment, the distance is at least a diameter of the nozzle bore. Retaining the nozzle bore scraper away from the outlet aperture by at least the diameter of the nozzle bore helps to equalize any pressure differences experienced by the effluent gas and helps to restore normal flow of the effluent gas prior to exiting the outlet aperture.

In one embodiment, the nozzle bore scraper has an aperture to facilitate effluent gas flow from the inlet aperture to the outlet aperture. Accordingly, the presence of the nozzle bore scraper within the nozzle bore is intended to have little impact on the flow of effluent gas through the nozzle bore.

In one embodiment, the nozzle bore scraper is hollow. Providing a hollow scraper enables effluent gas to flow along inside the nozzle bore.

In one embodiment, the nozzle bore scraper is a cylinder

In one embodiment, the nozzle bore scraper is a coil spring.

In one embodiment, the nozzle bore scraper comprises a shaped cutting end for dislodging effluent gas deposits within the nozzle bore when moving between the rest position and the actuated position. Providing a shaped cutting end with a chiselled edge improves the efficiency of removal of the deposits within the nozzle bore.

In one embodiment, an external diameter of the nozzle bore scraper corresponds with an internal diameter of the nozzle bore. It will be appreciated that the external diameter and internal diameter may be set to values which allows for continued operation of the nozzle bore scraper without seizing under different operating temperatures, whilst still scraping a good proportion of the residues from within the nozzle bore.

In one embodiment, the nozzle bore scraper extends from the inlet aperture and slidingly couples with the inlet pipe. Providing a sliding coupling enables the nozzle bore scraper to extend along a greater distance of the nozzle bore whilst still enabling the inlets to be coupled with the inlet assembly.

In one embodiment, one of the nozzle bore scraper and the inlet pipe is slidingly received within the other. Accordingly, it will be appreciated that either the nozzle bore scraper may be accommodated within the inlet pipe or the inlet pipe may be accommodated within the nozzle bore scraper.

In one embodiment, the nozzle bore scraper slidingly couples with the inlet pipe when moving between the rest position and the actuated position.

In one embodiment, the inlet assembly comprises a purge device operable to deliver a purge fluid between the nozzle bore scraper and the nozzle bore. Providing a purge device which delivers a purge fluid between the nozzle bore and the scraper helps to reduce the likelihood of deposits occurring between the nozzle bore and the scraper when the nozzle bore scraper is in the rest position.

In one embodiment, the purge device is operable to deliver the purge fluid to a void housing the actuator. Again, delivering the purge fluid to the void reduces the likelihood of deposits occurring within the void or on the actuator.

In one embodiment, the purge device is operable to perform delivery of the purge fluid either periodically or continuously.

In one embodiment, the inlet assembly comprises a secondary scraper housed within the nozzle bore scraper and operable to reciprocate relative to the nozzle bore scraper to reduce effluent gas deposits within the nozzle bore scraper. Providing a secondary scraper within the nozzle bore scraper helps to reduce deposits occurring on the nozzle bore scraper itself.

In one embodiment, the secondary scraper is retained within the nozzle bore, reciprocation of the nozzle bore scraper relative to the nozzle bore reciprocates the secondary scraper relative to the nozzle bore scraper to reduce effluent gas deposits within the nozzle bore scraper. Accordingly, the reciprocation of the nozzle bore scraper relative to the nozzle bore both causes deposits within the nozzle bore and deposits within the nozzle bore scraper to be removed simultaneously. It will be appreciated that this significantly simplifies the mechanical arrangement of the inlet assembly.

In one embodiment, the secondary scraper is retained by a lance coaxially positioned within the nozzle bore. It will be appreciated that a lance is often provided to facilitate the introduction of additional fluids to mix with the effluent gas stream on entry to the combustion chamber. This provides a can convenient fixing position for the secondary scraper.

In one embodiment, the secondary scraper is a coil spring.

In one embodiment, the coil spring has an internal diameter at a first end for retaining engagement with the lance and an external diameter at a second end which corresponds with an internal diameter of the nozzle bore scraper.

In one embodiment, the nozzle bore is defined by a nozzle housed within the manifold. Accordingly, a separate nozzle or nozzle lining may be provided within the manifold which defines the nozzle bore.

In one embodiment, the assembly comprises a plurality of inlet apertures and coaxially aligned outlet apertures, each having a nozzle bore and an associated nozzle bore scraper.

In one embodiment, the actuator is operable to reciprocate each nozzle bore scraper relative to its nozzle bore. Accordingly, a single actuator may be provided which causes the reciprocal movement of each of the nozzle bore scrapers relative to its nozzle bore, which again significantly simplifies the mechanical arrangement.

According to a second aspect, there is provided a method of reducing effluent gas deposits within a nozzle bore of an inlet assembly for a burner, the inlet assembly comprising a manifold having an inlet aperture and a coaxially aligned outlet aperture, the manifold having a nozzle bore extending along a longitudinal axis between the inlet aperture and the outlet aperture for conveying an effluent gas from an inlet pipe coupleable with the inlet aperture to the outlet aperture for delivery to a combustion chamber of the burner, the method comprising the steps of: housing a nozzle bore scraper within the nozzle bore; and reciprocating the nozzle bore scraper relative to the nozzle bore using an actuator, the nozzle bore scraper reciprocating along the longitudinal axis within the nozzle bore between a rest position and an actuated position to reduce effluent gas deposits within the nozzle bore.

In one embodiment, the nozzle bore is one of linear, straight and cylindrical.

In one embodiment, the nozzle bore is one of a parallel-sided cylinder and a normal cylinder.

In one embodiment, the inlet aperture and the outlet aperture are concentric.

In one embodiment, the nozzle bore is shaped to provide a generally unidirectional flow of the effluent gas from the inlet aperture to be outlet aperture.

In one embodiment, the nozzle bore scraper is dimensioned to extend at least partially along the longitudinal axis.

In one embodiment, the nozzle bore scraper is dimensioned have a longitudinal length which exceeds a longitudinal distance of throw between the rest position and the actuated position.

In one embodiment, the step of reciprocating causes the nozzle bore scraper to protrude from the outlet aperture in the actuated position.

In one embodiment, the step of reciprocating causes the nozzle bore scraper to be retained within the nozzle bore in the rest position.

In one embodiment, the nozzle bore scraper is retained within the nozzle bore at a distance from the outlet aperture in the rest position.

In one embodiment, the distance is at least a diameter of the nozzle bore.

In one embodiment, the nozzle bore scraper has an aperture to facilitate effluent gas flow from the inlet aperture to the outlet aperture.

In one embodiment, the nozzle bore scraper is hollow.

In one embodiment, the nozzle bore scraper is a cylinder

In one embodiment, the nozzle bore scraper is a coil spring.

In one embodiment, the nozzle bore scraper comprises a shaped cutting end for dislodging effluent gas deposits within the nozzle bore when moving between the rest position and the actuated position.

In one embodiment, an external diameter of the nozzle bore scraper corresponds with an internal diameter of the nozzle bore.

In one embodiment, the nozzle bore scraper extends from the inlet aperture and slidingly couples with the inlet pipe.

In one embodiment, one of the nozzle bore scraper and the inlet pipe is slidingly received within the other.

In one embodiment, the nozzle bore scraper slidingly couples with the inlet pipe when moving between the rest position and the actuated position.

In one embodiment, the method comprises the step of delivering a purge fluid between the nozzle bore scraper and the nozzle bore using a purge device.

In one embodiment, the step of delivering a purge fluid delivers the purge fluid to a void housing the actuator.

In one embodiment, the step of delivering a purge fluid delivers occurs periodically or continuously.

In one embodiment, the inlet assembly comprises a secondary scraper housed within the nozzle bore scraper and the step of reciprocating reciprocates the nozzle bore scraper relative to the nozzle bore scraper to reduce effluent gas deposits within the nozzle bore scraper.

In one embodiment, the secondary scraper is retained within the nozzle bore, the step of reciprocating reciprocates the secondary scraper relative to the nozzle bore scraper to reduce effluent gas deposits within the nozzle bore scraper.

In one embodiment, the secondary scraper is retained by a lance coaxially positioned within the nozzle bore.

In one embodiment, the secondary scraper is a coil spring.

In one embodiment, the coil spring has an internal diameter at a first end for retaining engagement with the lance and an external diameter at a second end which corresponds with an internal diameter of the nozzle bore scraper.

In one embodiment, the nozzle bore is defined by a nozzle housed within the manifold.

In one embodiment, the assembly comprises a plurality of inlet apertures and coaxially aligned outlet apertures, each having a nozzle bore and an associated nozzle bore scraper.

In one embodiment, the actuator is operable to reciprocate each nozzle bore scraper relative to its nozzle bore.

According to a third aspect, there is provided a burner inlet assembly, comprising: a manifold having an inlet aperture and a coaxially aligned outlet aperture, the manifold having a nozzle bore extending along a longitudinal axis between the inlet aperture and the outlet aperture for conveying an effluent gas from an inlet pipe coupleable with the inlet aperture to the outlet aperture for delivery to a combustion chamber of the burner; a nozzle bore scraper housed within the nozzle bore; and an actuator operable to reciprocate the nozzle bore scraper relative to the nozzle bore, the nozzle bore scraper reciprocating along the longitudinal axis within the nozzle bore between a rest position and an actuated position to reduce effluent gas deposits within the nozzle bore.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Overview

Before discussing the embodiments in any more detail, first an overview will be provided. Embodiments provide a burner inlet assembly. Although the following embodiments describe the use of radiant burners, it will be appreciated that the inlet assembly may be used with any of a number of different burners such as, for example, turbulent flame burners or electrically heated oxidisers. Radiant burners are well known in the art, such as that described in EP 0 694 735. The processing of effluent gases such as gases such as silane, chloro-silanes and organo-silane produces solid by-products such as $SiO_2$ and $(NH_4)_2SiF_6$. These tend to deposit on surfaces which the effluent gases contacts. These solid by-products can become particularly hard and immovable due to sintering caused by heat from the combustion chamber of the radiant burner. The radiant burner inlet assembly has a cleaning mechanism which cleans residues caused by an effluent gas to be treated by the radiant burner on inlet nozzles of the radiant burner inlet assembly which receive the effluent gas and convey this to the combustion chamber of a radiant burner for treatment. The nozzle is a straight bore, which helps to reduce the likelihood of deposits forming compared to that of a nozzle which has changes in direction. This alignment also causes the gas stream to flow in an approximately straight line without the need to change direction. The cleaning mechanism has a scraper which moves within the bore under the action of an actuator in order to reduce the presence of deposits within the nozzle. Movement of the scraper towards an outlet aperture causes deposits within the nozzle bore to be removed from the nozzle bore. Reducing the deposits within the nozzle helps to improve the reliability of the radiant burner since otherwise the flow of the effluent gas into the combustion chamber can become reduced. In addition, deposits within the nozzles can affect the chemistry of the processing of the effluent gas. Furthermore, cleaning and maintaining the nozzles reduces processing downtime. The actuator is located off-centre from either the inlet of the nozzle, the outlet of the nozzle or the longitudinal axis of the nozzle.

Direct Inlet Coupling

Figure 1:
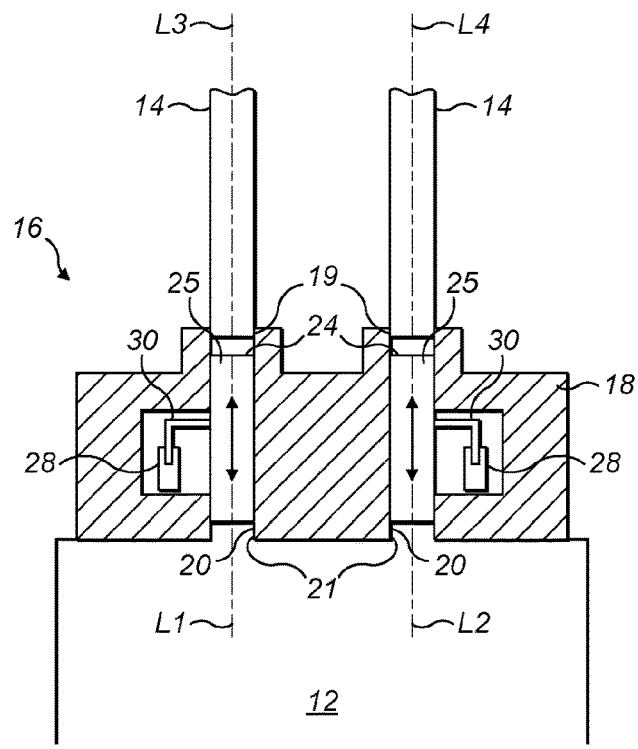
FIGS. 1 and 2 illustrate an inlet assembly having nozzle bore scrapers in their retracted and extended positions respectively according to one embodiment.
Figure 2:
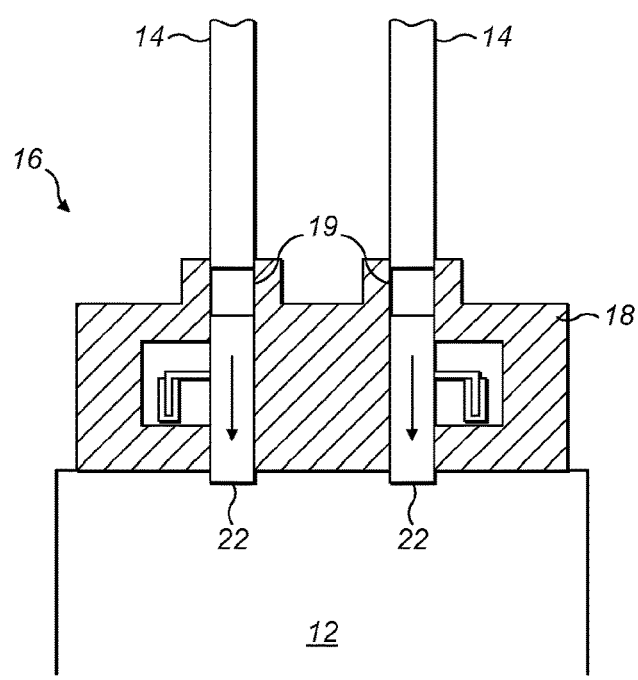

FIGS. 1 and 2 illustrate schematically the arrangement of an inlet assembly, generally 16, for a radiant burner according to one embodiment. The inlet assembly 16 couples with inlet pipes 14 which receive an effluent gas stream pumped from, for example, a semiconductor or flat panel display processing tool [not shown] by means of a vacuum pumping system [not shown]. In this example arrangement, four inlet pipes 14 are provided, although only two are shown in the illustrated cross-section. The inlet pipes 14 engage with a respective inlet aperture 19. An outlet aperture 21 is provided, which is coaxial and concentric with the inlet aperture 19. A straight, longitudinal bore 20 extends between the inlet aperture 19 and the outlet aperture 21. That is to say that the nozzle bore 20 defines a normal cylindrical void in the inlet manifold 18; the centre point of the inlet aperture 19 aligns with the centre point of the outlet aperture 21 and a line between the centre point of the inlet aperture 19 and the outlet aperture 21 defines the longitudinal axis of the nozzle bore 20. In the following embodiments, the nozzle bore 20 extends normally (i.e. perpendicularly) from the intersecting faces of the manifold 18, however, it will be appreciated that the nozzle bore 20 may extend at a non-normal angle. Even at a non-normal angle, the nozzle bore defined between the inlet aperture and the outlet aperture will be a straight, parallel-sided cylinder. The manifold 18 typically comprises a ceramic, heat resistant material.

Disposed within the nozzle bore 20 is a nozzle scraper 25. The nozzle scraper 25 is a hollow cylinder having an internal aperture through which the effluent gas can pass along the longitudinal axis L3-L1; L4-L2. Hence, the effluent gas will be conveyed from the inlet pipes 14, via the inlet aperture 19 into the nozzle bore 20, through the internal aperture (not shown) of the nozzle scraper 25 and from the outlet aperture 21 into the combustion chamber 12 for processing.

Actuators 28 are provided which couple using a coupling 30 with a respective scraper 25 to facilitate longitudinal movement of the scraper 25 within the nozzle bore 20. In this example, the scrapers 25 are elongate cylinders. The scrapers 25 are shown in their rest or retracted position in FIG. 1 where the nozzle end 25 is in proximity to the inlet pipe 14 and in their actuated or protruding position in FIG. 2 where the nozzle end 22 protrudes from the outlet aperture 21. Movement between the rest and actuated position is effected by the actuators 28 which typically provide for translation of the scrapers under pneumatic action. The movement of the scrapers 25 between the rest and actuated position causes scraping of deposits which accumulate on the nozzle bore 20. Such deposits will typically accumulate in the region of the outlet aperture 21 and may become particularly hard due to the sintering action of the heat from the combustion chamber 12.

Although in this example the nozzle bore 20 and the scrapers 25 are cylindrical, it will be appreciated that this need not be the case as long as the two are complementary shaped. The arrangement between the scraper 25 and the nozzle bore 20 needs to be a sufficiently close fit between the outer surface of the scraper 25 and the inner surface of the nozzle bore 20 to efficiently remove any deposits. Also, the nozzle end 22 nearest the outlet aperture 21 will typically be shaped to provide a sharpened leading edge for cutting through accumulated deposits.

Sliding Inlet Coupling

Figure 3:
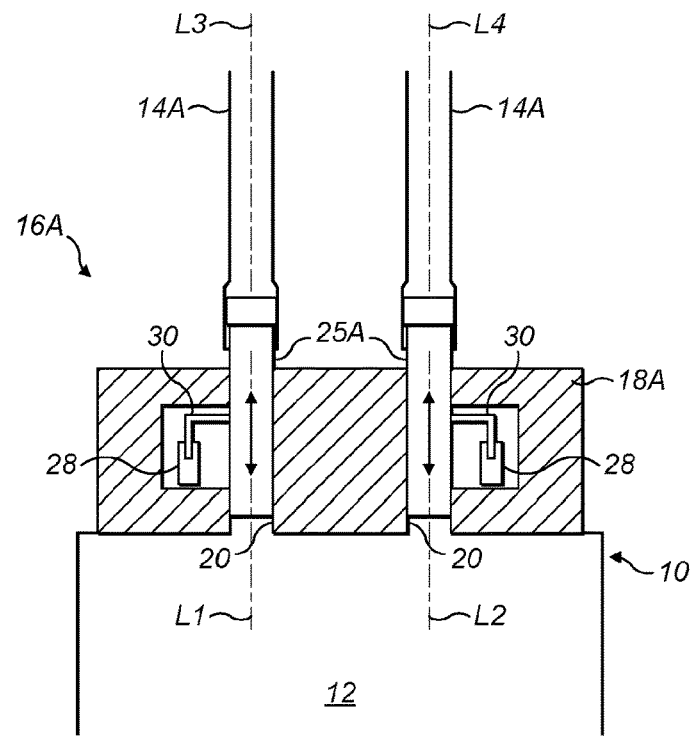
FIGS. 3 and 4 illustrate an inlet assembly having nozzle bore scrapers in their retracted and extended positions respectively according to one embodiment.
Figure 4:
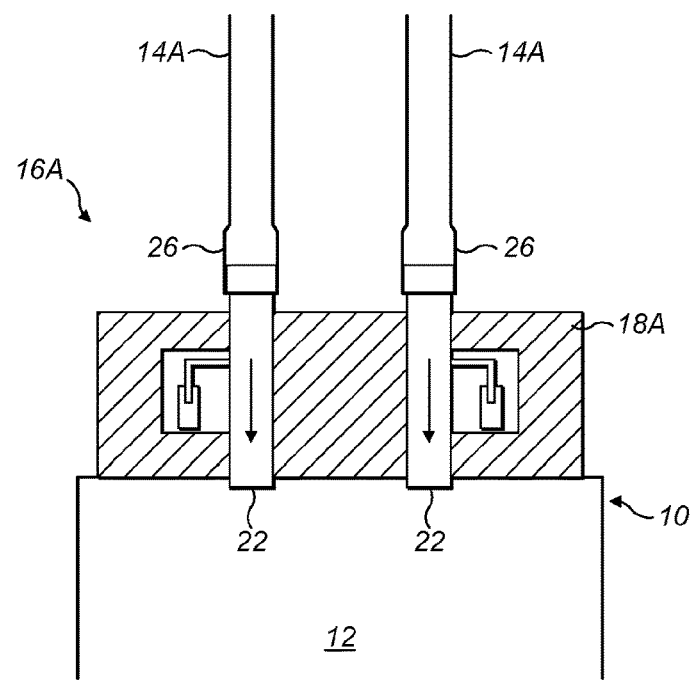

FIGS. 3 and 4 illustrate schematically a radiant burner inlet assembly, generally 16*a*, according to one embodiment. This embodiment is similar to that shown in FIGS. 1 and 2, with the scraper 25*a* shown in the retracted or rest position in FIG. 3 and in the actuated or extended position in FIG. 4.

However, in this arrangement, the scrapers 25*a* extend from the surface of the manifold 18*a* and couple with the inlet pipes 14*a*. In particular, the scrapers 25*a* slidingly couple with the inlet pipes 14*a* during reciprocation of the scraper 25*a* between the rest and the actuated positions. In this arrangement, the scraper 25*a* is slidingly received within an enlarged end 26 of a corresponding inlet pipe 14*a*. It will be appreciated that the arrangement needs to provide a close fit or a seal between the outer surface of the scraper 25*a* and the inner surface of the inlet pipe 14*a* to resist leakage of the effluent gas. However, it will be appreciated that the arrangement could be reversed with the inlet pipes 14*a* being received within the internal diameter of the scraper 25*a*.

Gas Purge

Figure 5:
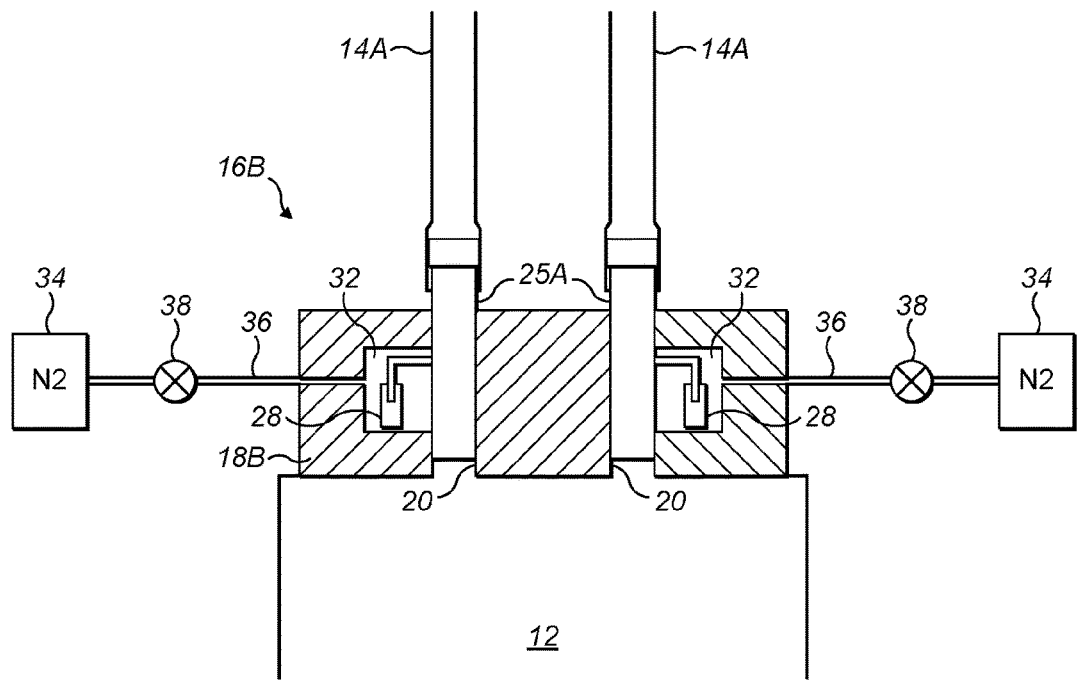
FIG. 5 illustrate an inlet assembly having a gas purge device according to one embodiment.

FIG. 5 illustrates schematically the arrangement of a radiant burner inlet assembly, generally 16*b* according to one embodiment. This embodiment utilizes a nitrogen source 34 coupled with a valve 38 which supplies, via a conduit 36, nitrogen gas to the void 32 housing the actuators 28. The constant or periodic application of nitrogen to the void 32 prevents or reduces the flow of effluent gas into the void 32 to prevent the accumulation of any effluent gas deposits therein. This helps to prevent any effluent gas deposits from interfering with the operation of the actuator 28. Furthermore, the nitrogen gas will also help to purge the interface between the scrapers 25a and the nozzle bore 20 to also help prevent the accumulation of residues at this interface, particularly when in the retracted or at rest position.

Common Actuator

Figure 6:
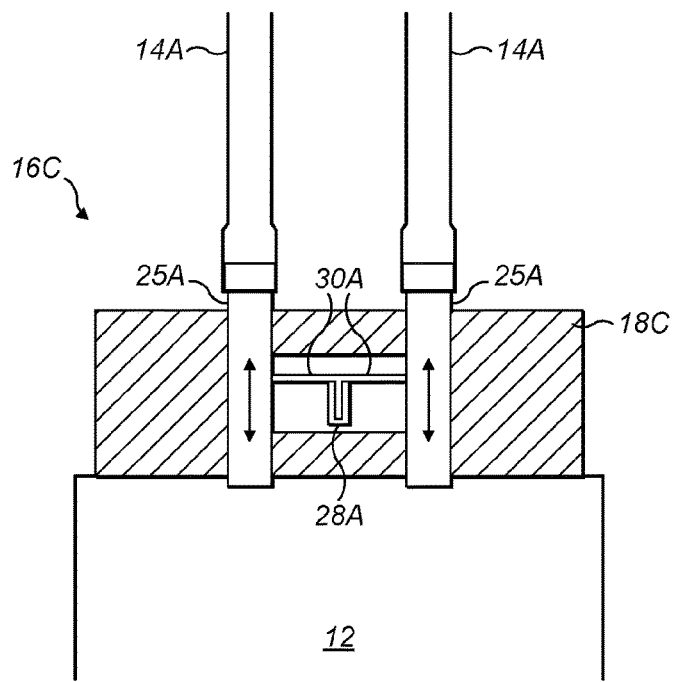
FIG. 6 illustrate an inlet assembly having a common actuator according to one embodiment.

FIG. 6 illustrates a radiant burner inlet assembly, generally 16c, according to one embodiment. This assembly uses a common actuator 28a which is used to reciprocate more than one scraper 25a at the same time. As can be seen, the common actuator 28a is coupled using a coupling 30a to each scraper 25a.

Spring Scraper

Figure 7:
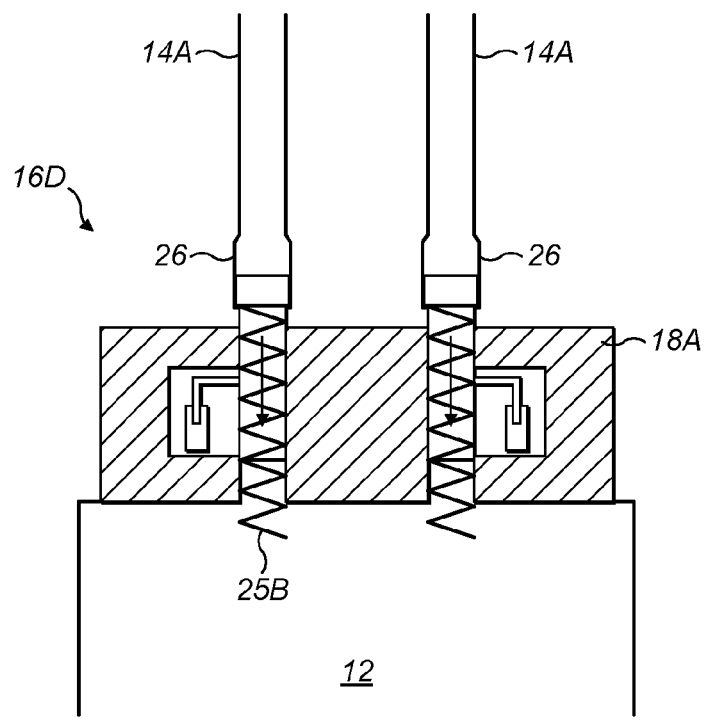
FIG. 7 illustrate an inlet assembly having alternative nozzle bore scrapers according to one embodiment.

FIG. 7 illustrates a radiant burner inlet assembly, generally 16d, according to one embodiment. This arrangement similar to that shown in FIG. 4, but rather than using a hollow cylindrical scraper 25a, a coil spring 25b is utilized instead. It will be appreciated that this arrangement could particularly benefit from the presence of the gas purge arrangement mentioned above since effluent gas may otherwise freely flow into the void housing the actuators if only the coil spring 25b is provided.

Lined Nozzle Bore

Figure 8:
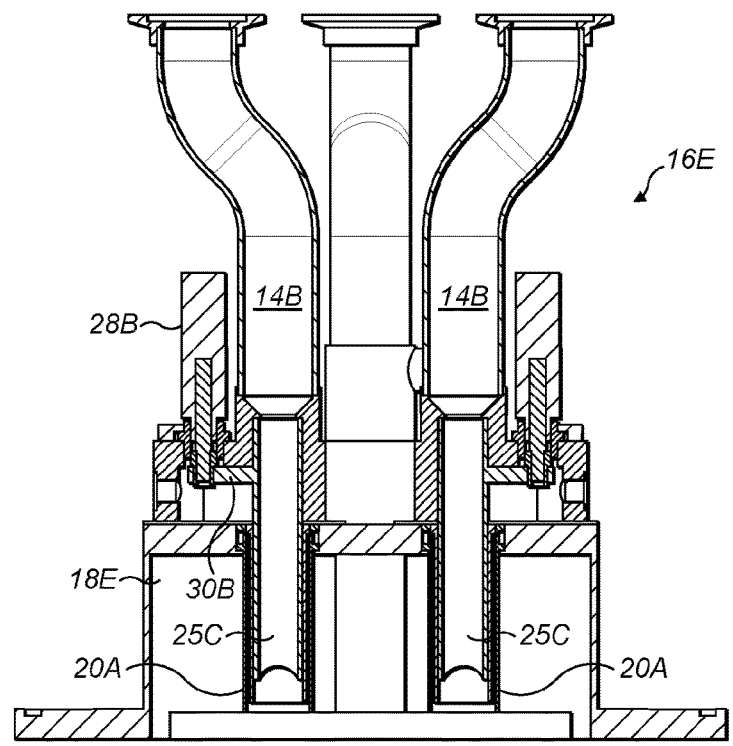
FIGS. 8 and 9 illustrate an inlet assembly having nozzle bore scrapers in their retracted and extended positions respectively according to one embodiment.
Figure 9:
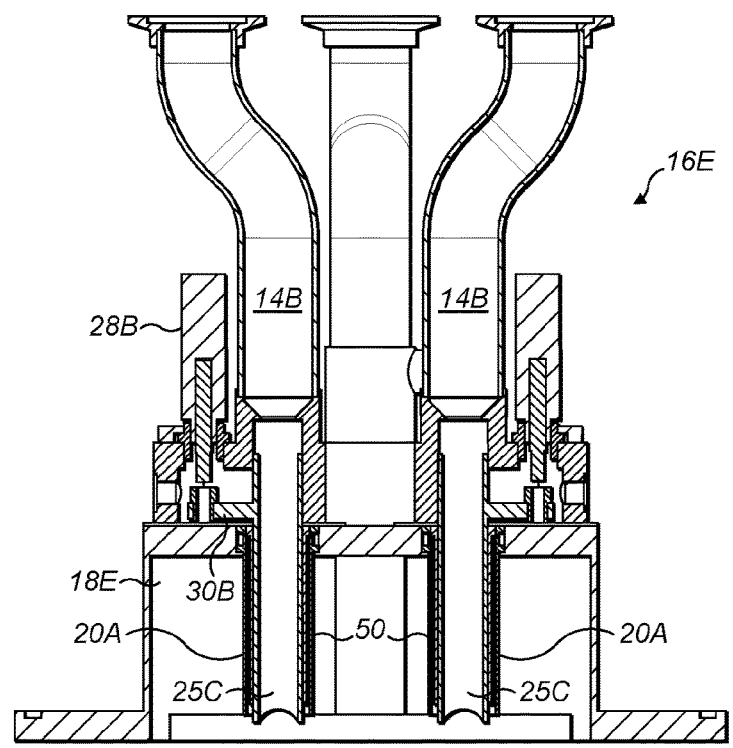

FIGS. 8 and 9 illustrate a radiant burner inlet assembly, generally 16e, according to one embodiment. In this embodiment, the inlet pipes 14b perform a dog-legged transition away from the manifold 18e to facilitate connection to the processing tools providing the effluent gas. The nozzle bore is lined with a nozzle sleeve 20a within which is provided a concentric lance 50 within which a nozzle scraper 25c is placed. The lance 50 may be used to introduce further fluids for mixing with the effluent gas stream on entry to the combustion chamber. The nozzle scraper 25c translates from the retained or rest position by the actuator 28b via a coupling 30b as shown in FIG. 8 to the extruded or actuated position as shown in FIG. 9.

Secondary Nozzle Bore Scraper

Figure 10:
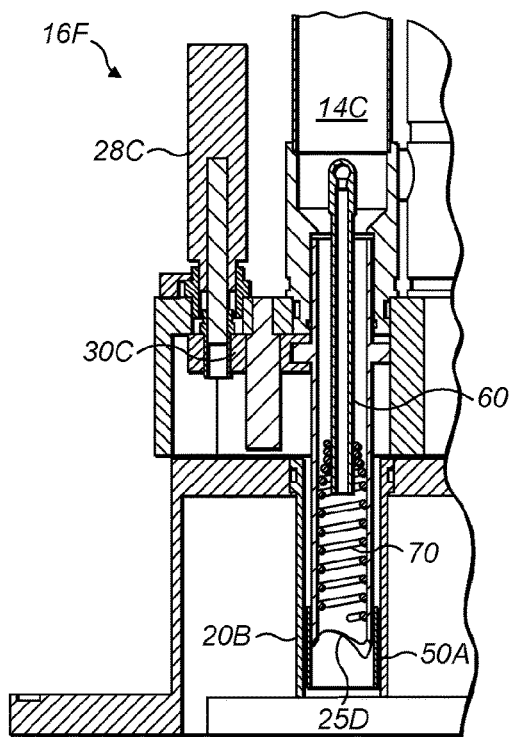
FIGS. 10 and 11 illustrate a portion of an inlet assembly having a nozzle bore scraper and a secondary nozzle bore scraper in their retracted and extended positions respectively according to one embodiment.
Figure 11:
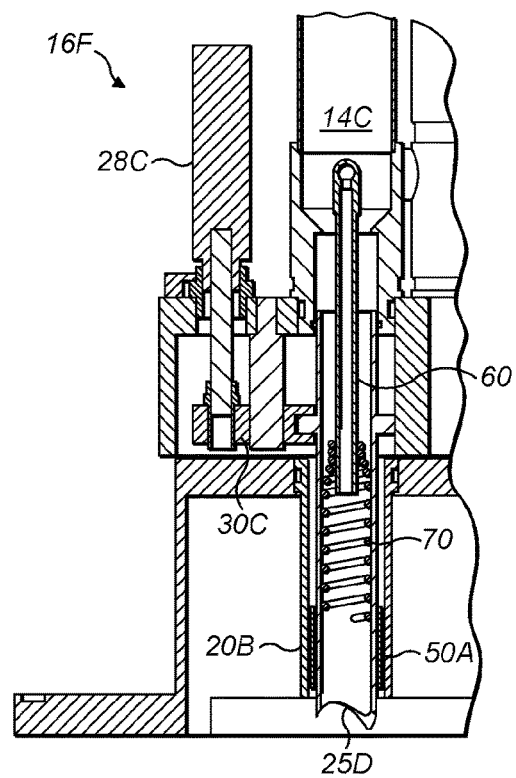

FIGS. 10 and 11 illustrate a portion of a radiant burner inlet assembly, generally 16f, according to one embodiment. In this embodiment, the nozzle bore is lined with a nozzle sleeve 20b within which is provided a concentric lance 50a within which a nozzle scraper 25d is placed. The lance 50a may be used to introduce further fluids for mixing with the effluent gas stream on entry to the combustion chamber. The nozzle scraper 25d translates from the retained or rest position by the actuator 28c via a coupling 30c as shown in FIG. 8 to the extruded or actuated position as shown in FIG. 9.

A further lance 60 is provided which is retained within the inlet 14c at a proximal end and is concentric within the nozzle bore. At a distance of the lance 60 is provided a coil spring 17. The coil spring 17 has a changing radius along its longitudinal length. The diameter of the coil spring 17 is dimensioned to engage with the outer surface of the lance 60 to be fixedly retained thereon. The outer diameter of the coil spring 70 is dimensioned to engage with the inner surface of the nozzle bore scraper 25d.

As can be seen in FIGS. 10 and 11, as the location of the nozzle bore scraper 25d translates, residues on the inner surface of the lance 50a positioned within the nozzle bore are scraped by the nozzle bore scraper 25d and residues on the inner surface of the nozzle bore scraper 25d are scraped by the coil spring 70.

It will be appreciated that features of the embodiments above may be incorporated or combined together in other embodiments in combinations which differ to that mentioned above.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An inlet assembly for a burner, said inlet assembly comprising:
   a manifold having an inlet aperture and a coaxially aligned outlet aperture, said manifold having a nozzle bore which is linear, straight and cylindrical and extends along a longitudinal axis between said inlet aperture and said outlet aperture for conveying an effluent gas from an inlet pipe coupleable with said inlet aperture to said outlet aperture for delivery to a combustion chamber of said burner;
   a hollow nozzle bore scraper housed within said nozzle bore; and
   an actuator located off-center from either the inlet of the nozzle bore, the outlet of the nozzle bore or the longitudinal axis of the nozzle bore operable to reciprocate said nozzle bore scraper relative to said nozzle bore, said nozzle bore scraper reciprocating along said longitudinal axis within said nozzle bore between a rest position and an actuated position to reduce effluent gas deposits within said nozzle bore;
   wherein the nozzle bore is shaped to provide an unidirectional flow of the effluent gas from the inlet aperture to the outlet aperture to reduce the likelihood of deposits occurring within the nozzle bore.

2. The inlet assembly of claim 1, wherein said nozzle bore scraper protrudes from said outlet aperture in said actuated position.

3. The inlet assembly of claim 1, wherein the nozzle bore scraper is retained within the nozzle bore in the rest position at a distance which is at least a diameter of said nozzle bore.

4. The inlet assembly of claim 1, wherein said nozzle bore scraper is one of a cylinder and a coil spring.

5. The inlet assembly of claim 1, wherein said nozzle bore scraper comprises a shaped cutting end for dislodging effluent gas deposits within said nozzle bore when moving between said rest position and said actuated position.

6. The inlet assembly of claim 1, wherein an external diameter of said nozzle bore scraper corresponds with an internal diameter of said nozzle bore.

7. The inlet assembly of claim 1, wherein said nozzle bore scraper extends from said inlet aperture and slidingly couples with said inlet pipe.

8. The inlet assembly of claim 1, wherein one of said nozzle bore scraper and said inlet pipe is slidingly received within the other.

9. The inlet assembly of claim 1, further comprising a purge device operable to deliver a purge fluid between said nozzle bore scraper and said nozzle bore.

10. The inlet assembly of claim 1, further comprising a secondary scraper housed within said nozzle bore and operable to reciprocate relative to said nozzle bore scraper to reduce effluent gas deposits within said nozzle bore scraper.

11. The inlet assembly of claim 10, wherein said secondary scraper is retained within said nozzle bore, reciprocation of said nozzle bore scraper relative to said nozzle bore reciprocates said secondary scraper relative to said nozzle bore scraper to reduce effluent gas deposits within said nozzle bore scraper.

12. The inlet assembly of claim 10, wherein said secondary scraper includes a coil spring.

13. The inlet assembly of claim 12, wherein said coil spring has an internal diameter at a first end for retaining engagement with said lance and an external diameter at a second end which corresponds with an internal diameter of said nozzle bore scraper.

14. A method of reducing effluent gas deposits within a nozzle bore of an inlet assembly for a burner, said inlet assembly comprising a manifold having an inlet aperture and a coaxially aligned outlet aperture, said manifold having said nozzle bore which is linear, straight and cylindrical and extends along a longitudinal axis between said inlet aperture and said outlet aperture for conveying an effluent gas from an inlet pipe coupleable with said inlet aperture to said outlet aperture for delivery to a combustion chamber of said burner, said method comprising the steps of:

housing a hollow nozzle bore scraper within said nozzle bore; and reciprocating said nozzle bore scraper relative to said nozzle bore using an actuator, located off-center from either the inlet of the nozzle bore, the outlet of the nozzle bore or the longitudinal axis of the nozzle bore, said nozzle bore scraper reciprocating along said longitudinal axis within said nozzle bore between a rest position and an actuated position to reduce effluent gas deposits within said nozzle bore; wherein the nozzle bore is shaped to provide an unidirectional flow of the effluent gas from the inlet aperture to the outlet aperture to reduce the likelihood of deposits occurring within the nozzle bore.

* * * * *